(12) United States Patent
Driscoll et al.

(10) Patent No.: US 8,571,964 B2
(45) Date of Patent: Oct. 29, 2013

(54) METHODS AND SYSTEMS FOR MEASURING COMPARATIVE DATA

(75) Inventors: James R. Driscoll, New York, NY (US); Matthew W. Claus, Summit, NJ (US)

(73) Assignee: CFPH, LLC, New York, NY (US)

( * ) Notice: Subject to any disclaimer, the term of this patent is extended or adjusted under 35 U.S.C. 154(b) by 997 days.

(21) Appl. No.: 11/680,070

(22) Filed: Feb. 28, 2007

(65) Prior Publication Data

US 2008/0208729 A1    Aug. 28, 2008

(51) Int. Cl.
*G06Q 40/00* (2012.01)
(52) U.S. Cl.
USPC ............... 705/37; 705/36 R; 705/35
(58) Field of Classification Search
USPC ...................................... 705/35–45
See application file for complete search history.

(56) References Cited

U.S. PATENT DOCUMENTS

| | | | |
|---|---|---|---|
| 6,779,018 B1* | 8/2004 | Yamashita et al. | 709/203 |
| 2003/0014464 A1* | 1/2003 | Deverill et al. | 709/101 |
| 2003/0225672 A1* | 12/2003 | Hughes et al. | 705/37 |
| 2004/0103193 A1* | 5/2004 | Pandya et al. | 709/224 |
| 2004/0177002 A1* | 9/2004 | Abelow | 705/14 |
| 2004/0199452 A1 | 10/2004 | Johnston et al. | |
| 2004/0210512 A1* | 10/2004 | Fraser et al. | 705/37 |
| 2005/0018694 A1* | 1/2005 | Mitani et al. | 370/396 |
| 2005/0160163 A1* | 7/2005 | Nguyen et al. | 709/223 |
| 2006/0116943 A1* | 6/2006 | Willain | 705/35 |
| 2006/0218072 A1* | 9/2006 | Noviello et al. | 705/37 |
| 2006/0235786 A1* | 10/2006 | DiSalvo | 705/37 |

FOREIGN PATENT DOCUMENTS

EP    1746769 A1    1/2007

OTHER PUBLICATIONS

Neural networks and their extensions for business decision-making Agarwal, A. (1993). Neural networks and their extensions for business decision-making. (9401195, The Ohio State University). ProQuest Dissertations and Theses, 137-137 p. Retrieved from http://search.proquest.com/docview/304060951?accountid=14753. (304060951).*
Hitting the limits of neural networks Nevler, J. (1993). Hitting the limits of neural networks. Wall Street & Technology, 11(7), 34. Retrieved from http://search.proquest.com/docview/206612631?accountid=14753.*

(Continued)

*Primary Examiner* — Olabode Akintola
*Assistant Examiner* — Abhishek Vyas
(74) *Attorney, Agent, or Firm* — Ruth Ma Swilling

(57) ABSTRACT

Methods and corresponding system are provided herewith that, in at least one embodiment, include the act or acts of determining a first instance in which a first request is received by an exchange; determining a second instance in which a second request is received by the exchange, in which the second request defines a request to cancel the first request; determining a third instance in which a third request is received by the exchange, in which the third request corresponds to the first request; calculating a first difference between the second instance and the third instances; storing the first difference to a data storage, in which the data storage comprises a plurality of differences; and analyzing the plurality of differences to generate comparative information.

27 Claims, 3 Drawing Sheets

(56) References Cited

OTHER PUBLICATIONS

Efficient bit-parallel supercomputer architectures and algorithms Kramer, D. A. (1993). Efficient bit-parallel supercomputer architectures and algorithms. (9311225, Princeton University). ProQuest Dissertations and Theses, , 142-142 p. Retrieved from http://search.proquest.com/docview/304100696?accountid=14753. (304100696).*

Recursive Algorithms for Stock Liquidation: A Stochastic Optimization Approach Yin, G., Liu, R. H., & Zhang, Q. (2002). Recursive algorithms for stock liquidation: A stochastic optimization approach. SIAM Journal on Optimization, 13(1), 240-24. doi:http://dx.doi.org/10.1137/S1052623401392901.*

Notification of Transmittal of the International Search Report and the Written Opinion for International Application No. PCT/US08/53192; Aug. 15, 2008.

Australian Examiner's Report for Application No. 2008200786, dated Jun. 25, 2009 (2 pages).

International Preliminary Report on Patentability for International Application No. PCT/US08/53192, dated Sep. 1, 2009 (6 pages).

Australian Notice of Acceptance for Application No. 2008200786, dated Aug. 27, 2010 (3 pages).

Japanese Office Action with English translation for Application No. 2008-46208, mailed May 24, 2011 (4 pages).

Japanese Office Action with English translation for Application No. 2008-46208, mailed Nov. 15, 2011 (5 pages).

Japanese Office Action with English translation for Application No. 2008-46208, mailed Mar. 13, 2012 (6 pages).

European Communication and Supplementary Search Report for Application No. 08729176.1, mailed Dec. 22, 2011 (9 pages).

Canadian Examination Report for Application No. 2,620,909, dated Apr. 18, 2012 (4 pages).

* cited by examiner

METHODS AND SYSTEMS FOR MEASURING COMPARATIVE DATA

DETAILED DESCRIPTION

Figure 1:
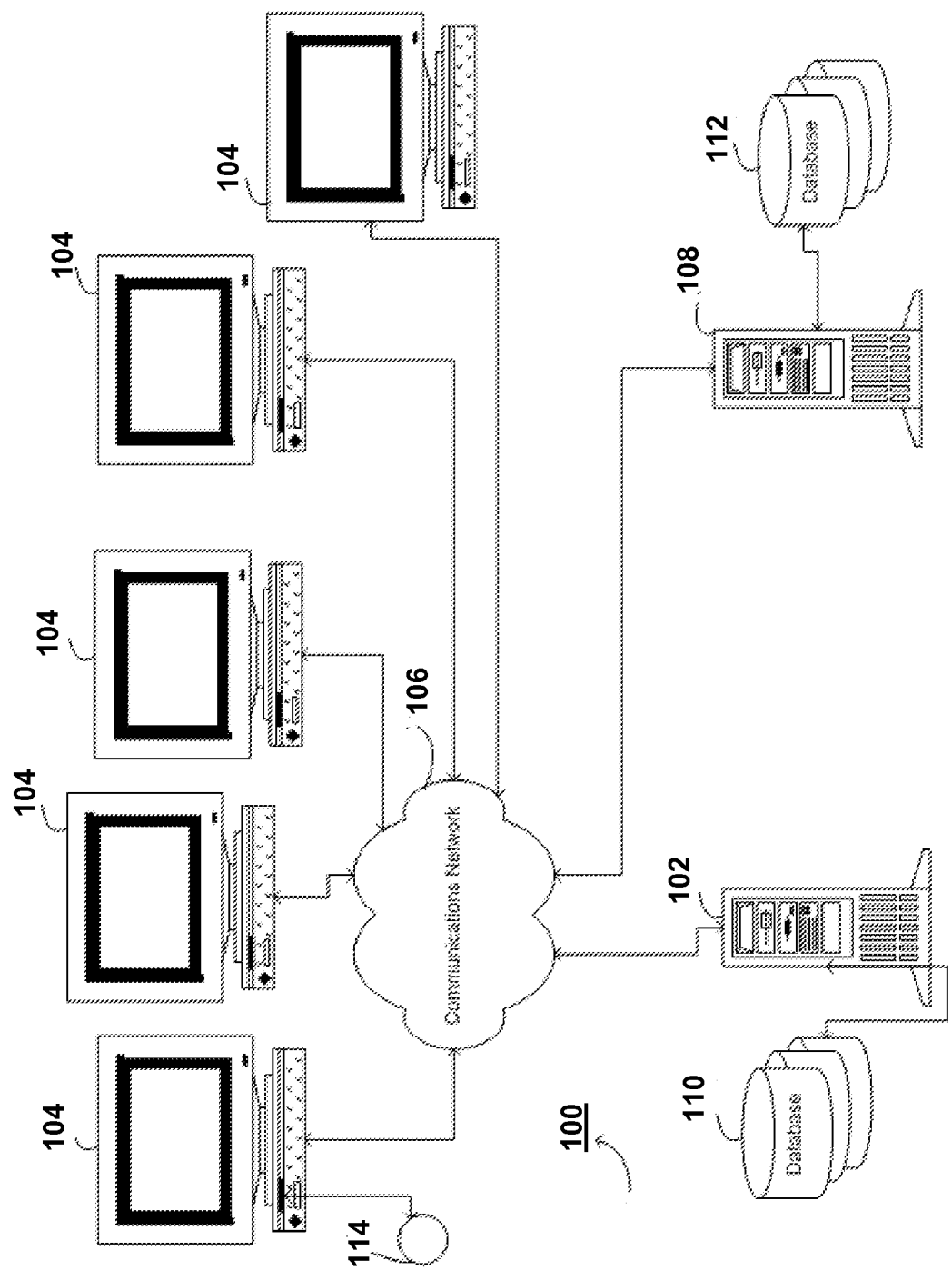
FIG. 1 illustrates a system according to at least one embodiment of the systems disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112 Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Overview of Various Embodiments

Embodiments include systems and methods for measuring and analyzing data information associated with a trading activity in order to provide comparative trading information.

Generally, an exchange represents a marketplace in which various types of securities are traded. These securities may include shares, options and/or futures on stocks, bonds, commodities, indices, etc. . . . Some principal US stock exchanges include the New York Stock Exchange (NYSE), American Stock Exchange (AMEX), National Association of Securities Dealers (NASDAQ), Chicago Mercantile Exchange (CME) and the Cantor Fitzgerald Spectrum & Tower Exchange.

In any given day, an exchange receives a plurality of requests from third-party entities. In some embodiments, these third-party entities are individuals or corporate entities that buy and sell securities for their own accounts. In other embodiments, the third-party entities are brokers or dealers who purchase and sell securities on behalf of a client. For the sake of convenience, all of the third party-entities mentioned above will be referred, henceforth, as "traders." It should be apparent that the term "trader" is meant to broadly apply to any user of a trading system, whether that user is an agent acting on behalf of itself, a principal, an individual, a legal entity (e.g., a corporation), etc., or any machine or mechanism that is capable of placing and/or responding to orders in a trading system.

In some embodiments, the trader uses a traditional voice-trading process. In other embodiments, the trader uses an electronic trading process, which conducts trading activities through a computer via an automated order entry and matching system. In such situations, the trader does not make the day-to-day decisions to place requests on an exchange; instead, an automated software program (comprising various algorithms and models) governs these day-to-day decisions. A trading algorithm represents a complex set of formulas and strategies used by an automated trading agent. The trading algorithm may be adjusted for any number of variables, including a trader's risk quotient, i.e. her willingness to take risks. For example, a trader may wish to adjust his trading algorithm to accommodate a low or high tolerance for risk. Thus, it is desirable for a trader to benchmark the performance of the automated programs, since this allows a trader to adjust the trading algorithms in a manner that, for example, improves the overall performance, increase profit margins, and increases or decreases risk tolerance.

Previously, a trader had limited means for measuring the rate of success for canceling a previously submitted request. Typically, this rate of success is measured by a percentage, specifically a percentage of successful cancellations for a period of time. For example, a trader may determine that during a particular period of time he submitted 400 requests to cancel, of which 200 were successful. Thus, the trader deduces that he has a 50% success rate in canceling requests to sell. If the trader is unhappy with these results, he may adjust his trading algorithms in order to increase the rate of success. Percentages, however, provide limited information, thus it would be advantageous for a trader to know specific details surrounding his attempts to cancel requests, such as the window of time, the quantity and type of entities attempting to bid on the submitted request.

a. Various Types of Requests

A trader may submit any number of financial commands to the exchange. These financial commands may include the submission of a bid (or a request to purchase securities) and/or an offer (or a request to sell securities). Depending on the circumstances, a trader may place a bid on the exchange as either a "passive bid" or an "active bid". A passive bid is a request to purchase securities, in which the bid remains on the exchange until it is matched with a corresponding offer. If no such match is made after a certain period of time, then the passive bid is cancelled either by the exchange or the originator of the request. On the other hand, an active bid is a request to purchase securities, in which the bid is matched against all offers that are available on the exchange at the instance of time, in which the bid was generated. Typically, an active bid is submitted in response to an active offer (which is detailed below) that was previously placed on the exchange.

Similarly, a trader also may place an offer on the exchange as either a "passive offer" or an "active offer". A passive offer is a request to sell securities, in which the offer remains on the exchange until it is matched with a corresponding bid. If no such match is made after a certain period of time, then the passive offer is cancelled either by the exchange or the originator of the request. An active offer is a request to sell securities, in which the offer is matched against all bids that are available on the exchange at the instance of time, in which the offer was generated. Similar to an active bid (described above), an active offer is generally submitted in response to an active bid that was previously placed on the exchange.

Some additional financial commands that may be transacted on the exchange may include a "request to cancel" a previously submitted bid or offer and a "request to modify" a previously submitted bid or offer. A "request to cancel" command seeks to cancel or remove a previously submitted request from the exchange. In a similar vein, "request to modify" seeks to modify one or more elements of a previously submitted request, such as the price or quantity of shares sold or purchased. However, if the exchange already has matched the previously submitted request with a corresponding request (e.g., a bid with an offer), then neither the "request to cancel" nor the "request to modify" may remove or modify, respectively, the previously submitted request.

Another financial command is a "request to hold" command, in which any active requests to buy or sell that are not immediately processed by the exchange are converted into passive requests. Specifically, the system would wait a period of time after receiving an active request. This period of time may have been determined in advance by the trader, the system, or another source. If no corresponding request is submitted before the period of time expires, then the system automatically converts the request from an active status to a passive status.

Still another transaction may be a "request to wait-and-see", in which the exchange locates a potential match for a request, but does not make an immediate match. Instead, the exchange waits for a pre-determined period of time to elapse, after which the exchange determines whether another match (better than the previously determined match) is available. If such better match is available, then this new bid or offer will trump the previous match. The parameters in determining what makes a new bid (or offer) "better" than a previously matched bid (or offer) are pre-determined by the trader. These parameters may include any number of factors, such as a higher price, a larger quantity of sale, etc. . . .

Any of the above-described financial commands may be coupled with an instruction, which instructs the exchange to execute a specific function in conjunction with a financial transaction. For example, an active request to buy or sell may be coupled with a "fill-or-kill" instruction, in which the exchange must cancel a submitted request, unless such request is traded in its entirety. On the other hand, a "fill-and-kill" instruction requires that the exchange cancel the remainder of a request upon the partial execution of that request. Another instruction may be an "only-at-best" instruction, in which the exchange only executes the request at the best price on the market, or otherwise the exchange cancels the request.

b. System Hardware

Referring to FIG. 1, a system 100, according to at least one embodiment of the systems disclosed herein, includes at least one computing device, such as a remote computer 102 (e.g., a server computer), a client computer 104, or a combination thereof. The term remote in this context merely means that the remote computer 102 and at least one of the client computers 104 are separate devices. Thus, the devices may be remote even if they are located within the same room. In at least one embodiment, the system includes at least one remote computer 102 that is connected over a communication network 106 to one or a plurality of client computers 104. One or more of the client computers 104 may be connected to the remote computer 102 through a firewall. In another embodiment, at least one remote computer 102 is connected over a communication network 106 to at least one other remote computer 108.

The system 100 may be implemented over any type of communications network 106, such as a local area network (LAN), a wide area network (WAN), the Internet, a telephone network (POTS), a wireless network, including cellular, WiFi, and WiMax networks, or a combination of wired and/or wireless networks. In certain instances, the communications network 106 may be independent of the Internet or limited with respect to the type of the information transmitted over the Internet, such as to information that poses little or no security risk if misappropriated or that has been encrypted.

In the networked embodiment, client computers 104 are preferably configured or otherwise capable of transmitting and/or receiving communications to and/or from the remote computer(s) 102, 108. The remote computers 102, 108 may similarly be configured or otherwise capable of transmitting and/or receiving communications between themselves. This may be accomplished with a communication element, such as a modem, an Ethernet interface, a transmitter/receiver, etc., that enables communication with a similarly equipped remote computer 102,108 wirelessly, wired, or a combination thereof. It is understood that the relative functionality described herein may be provided by the remote computers 102, 108, by the client computers 104, or both, and is thus not limited to any particular one of the implementations discussed herein. In at least one embodiment, the client computers 104 will generally provide the front-end functionality and the remote computer 102, 108 will provide the back-end functionality.

Although various embodiments may be described herein in relation financial instruments, it is understood that the methods and systems disclosed herein are equally applicable to non-financial instrument assets, such as commodities, money (in one or more currencies), goods, etc., and is thus not limited thereto. The term "financial instrument" denotes any instrument, issued by a corporation, government, or any other entity, that evinces dept or equity, and any derivative thereof, including equities, stocks, fixed income instruments, bonds, debentures, certificates of interest or deposit, warrants, options, futures, forwards, swaps, or generally any security.

The computing device, e.g., the client computers 104 and/or the remote computer 102, 108 generally include at least one processor, and a memory, such as ROM, RAM, FLASH, etc., including computer readable medium type memory, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 110, 112 for retrieving and/or storing the various types of data discussed herein, including identity verification data, such as an ID and password, biometric data, etc.

The client computers 104 may include, without limitation, a mobile phone, PDA, pocket PC, personal computer, as well as any special or other general purpose computing device. As such, the client computer 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 104, such as the PC or PDA, users may access the functionality provided by the system 100 with a browser application or any other generic application, or with special purpose software designed specifically for accessing the functionality disclosed herein.

In at least one embodiment, the client computer 104 includes or is otherwise associated with at least one biometric sensor 114. The biometric sensor 114 is any device that is used to determine directly from the user at least one item of biometric data associated with a user, such as a fingerprint reader, an iris scanner, a retinal scanner, a vascular pattern reader, a facial recognition camera, etc. The biometric sensor 114 may be embodied in hardware, software, or a combination thereof. The biometric sensor 114 may further share resources with other components of the client computer 104, such as the processor, memory, a camera, a microphone, a speaker, etc. A single biometric sensor 114 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 114 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

c. Methods and Systems

According to at least one embodiment of the methods disclosed herein, the method begins with the system 100 receiving login information. The login information may be any information for use in authenticating a user and providing thereto one or more of the functions disclosed herein. The login information may be, for example, a user ID, password, biometric data, etc. The login information may be submitted by a user with a user interface screen that includes therein at least one form element, such as an input field or text box, a drop down list, check box, radio buttons, action buttons, clickable images, etc., for entering login data. Following submission, the login information may be compared with previously obtained information and access to one or more of the functions may be provided based on a positive match.

Figure 2:
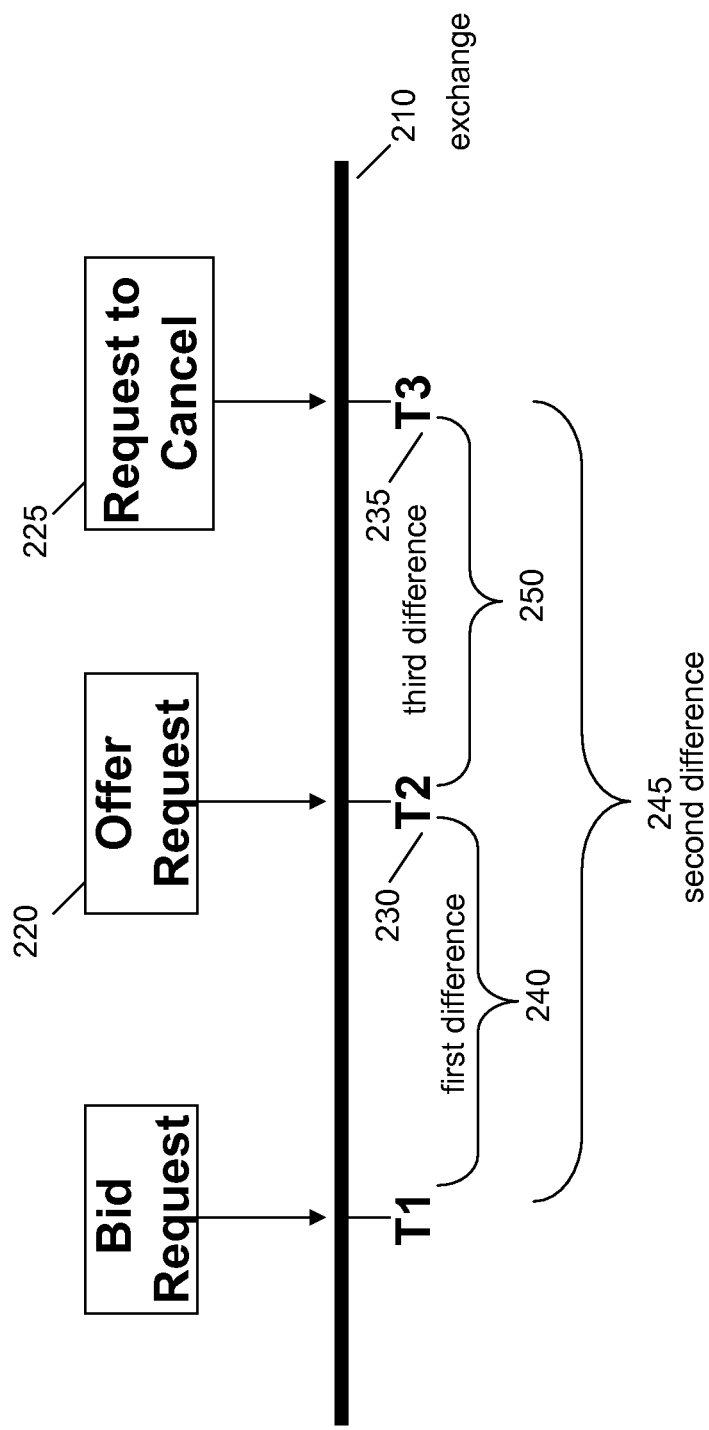
FIG. 2 illustrates one embodiment of a trading system, in which a request to cancel is received before an offer request.

FIG. 2 depicts some of the above-mentioned terms, such as a bid, an offer, a request to cancel, etc. . . . , through an illustrated example. Suppose a trader submits a bid request 205 (i.e., a request to sell) for a hundred shares of Acme Corporation stock at $0.05 per share. The exchange 210 receives bid 205 at a time instance (T1) and assigns a time-stamp 215 representative of time instance (T1) to the bid 205.

In some embodiments, the time-stamps are stored in a database associated with the exchange, so that the time-stamps may be retrieved at a later time. In other embodiments, the exchange transmits a message to the originator of the request, in which the message confirms receipt of the request. These messages from the exchange also may include an indicia of the time-stamp associated with the request. The messages may be in the form of an e-mail, a telephone call, an electronic posting on a website, etc. . . .

Now suppose at a later time, the trader decides to cancel his original bid 205. This decision to cancel may be based on various external reasons (e.g., changes in market conditions, at a client's behest) or internal reasons (e.g., intuition about the stock's future, personal reasons). Regardless of his reasons for wanting to cancel, the trader must react quickly in order to cancel this original bid 205. A failure to react in a timely manner may result in another trader submitting to the exchange an offer 220 in response to the bid 205, thereby potentially causing the exchange to make a match between the original bid 205 and the corresponding offer 220. Once the exchange has matched the bid 205 with the offer 220, the first trader may not cancel or remove his original bid 205 from the exchange. The short window of time in which a trader may effectively submit a request to cancel 225 may be referred to as the "cancellation window" 225.

Referring to FIG. 2, the exchange receives the offer request 220 and the request to cancel 225 at time instances (T2) and (T3), respectively. Likewise, the exchange assigns time-stamps 230 and 235 to time instances (T2) and (T3), respectively. The system then calculates a time-difference between each of the time stamps in order to determine whether the request to cancel has successful cancelled the previously submitted bid 205. The first time-difference 240 represents the difference between time intervals (T1, T2), which are associated with receipt of bid 205 and offer 220 by the exchange. The second time-difference 245 represents the difference between time intervals (T1, T3), which are associated with receipt of bid 205 and request to cancel 220 by the exchange. A second time-difference 245 that is greater than first time-difference 240 (as illustrated in FIG. 2) indicates that the trader did not react quickly enough, and his request to cancel 220 failed to remove the previously submitted bid 205 from the exchange. Instead, another trader has superseded the request of cancel 220 by placing an offer 220, which arrived at the exchange in an earlier time instance. Subsequently, the exchange may transmit a message to the trader, notifying that his attempt to cancel is previous bid 205 was unsuccessful. Likewise, the exchange may transmit a message to the second trader, notifying him that his offer 220 has been matched with the bid 205.

Referring to FIG. 2, the exchange also may calculate a third-time difference 250 representing the difference between time intervals (T2, T3), which are associated with the receipt of offer 220 and request to cancel 220 by the exchange. This third-time difference 250 provides a numeric measurement of the trader's failure to cancel. Specifically, the third-time difference 250 indicates "by how much" time the trader missed his opportunity to cancel. Moreover, the system may collect, over a period of time, the third-time differences 250 for a particular trader, and relay this useful information to the trader at the end of the time period. For example, if a trader notes that he consistently fails to cancel an original bid by 15 milliseconds, then he may use this information to adjust his trading algorithm in order to compensate for the time deficiency.

Such information may provide useful to a trader in a number of ways. For example, the system may indicate to a trader that for the past month, all of his requests to cancel have arrived, on average, 5 milliseconds after the exchange has formed a match between his previously submitted bid and a corresponding offer. The trader may use this information to modify his trading algorithm to react in a manner that compensate for this 5 millisecond lag time. In another example, the system indicates to the trader that his request to cancel arrived at the exchange a full minute after a match has been formed. Since requests typically arrive at an exchange within very small increments of time (e.g., milliseconds), this information alerts the trader to a potential problem in its transmission system. For example, an internet line may be down, thus resulting in a slow transmission time.

In some embodiments, the system may have a pre-determine threshold for acceptable time frame for a request to arrive on the exchange. If a request arrives at a time-interval that exceeds such pre-determined threshold, the system may automatically transmit to the trader a message that notifies him of a potential error in transmission. Various uses of the information as discussed below.

Figure 3:
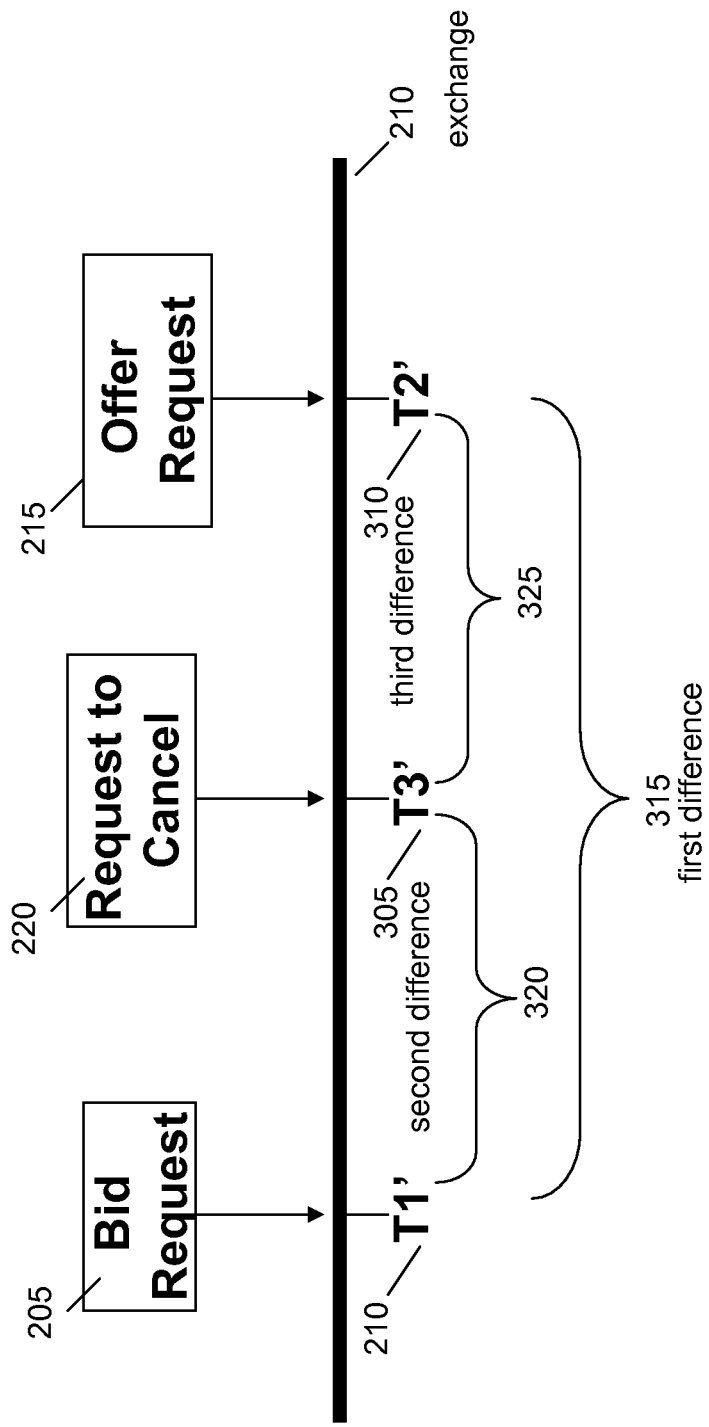
FIG. 3 illustrates one embodiment of a trading system, in which a request to cancel is received after an offer request.

FIG. 3 illustrates another embodiment in which the request to cancel 220 arrives at the exchange at a time instance (T3') 305 in advance of the offer 220, which arrives at a time instance (T2') 310. In this situation, the first time-difference (T1', T2') 315 is greater than the second time-difference (T1', T3') 320, thus indicating that the request to cancel 220 has successfully removed the previously submitted 205 from the exchange. In FIG. 3, the third-time difference (T2', T3') 325 provides a numeric measurement of the trader's success in cancelling his original bid 205. Specifically, the third-time difference 325 indicates "by how much" time the trader succeed in cancelling his previous bid. Similar to the situation described in FIG. 2, the system may collect, over a period of time, the third-time differences 325 for a particular trader, and relay this useful information to the trader at the end of the time period. For example, if a trader may note that he barely succeeds in cancelling his bids, then he may use this information to adjust his trading algorithm in order to compensate for the time deficiency.

In some embodiments, the request to buy or sell submitted by a trader may be for all or a portion of the original request to sell. For example in the illustrated embodiment, one buyer may submit a request to buy for 25 shares, while another buyer may submit a separate request to buy for 75 shares. Once the exchange determines a "match" between a request to sell and one or more requests to buy, then a transaction has taken place, and the original request to sell may no longer be removed from the exchange. Thus, the seller must react in a timely manner in order to cancel his original request to sell.

The data measured and collected by the system may be used in a number of ways. In some embodiments, the system measures the As described above, it is desirable for traders to benchmark the performance of their automated programs. In some embodiments, the system measures the various time differences (e.g., first, second and third time-differences), and transmits this information (in unanalyzed format) to a recipient.

In other embodiments, the system may collect the time differences over a period of time, and then analyze the collected data before conveying such analyzed data to the various recipients. The period of time encompasses any incremental period of time, such as weeks, months, quarters, or years.

Generally, the recipient may be a trader attempting to cancel a trader, or the recipient may be a trader that submitted a corresponding request to a request on the exchange. However, the recipient may be any number of entities. For example, the recipient may be a newcomer to the exchange. She may wish to evaluate the average cancellation times on the exchange in order to adjust her trading models to mirror the standard reaction times. The recipient also may be a representative of the actual trader(s).

In some embodiments, the traders may provide threshold against which the system may compare the collected data. For instance, a trader may determine, in advance, a reasonable period of time, say 30 milliseconds, for a request to arrive on an exchange. If the request arrives after the threshold time (i.e., the time reasonably determined), then the system automatically transmits an error message to the trader. Generally, a request arriving after the pre-determined threshold indicates that the trader may be experiencing external hardware problems with her trading system. For example, it may be an indication that the internet transmission line is faulty. Conversely, if a threshold has not been exceeded, then the information helps the trader eliminate external hardware as a contributing factor. As a result, the trader may focus on modifying various trading models or algorithms in response to the information.

In other embodiments, the threshold provides an indication that a certain level of risk tolerance has been exceeded. For instance, a trader may determine in advance that she wishes to have a cancellation window that is no less than 5 milliseconds. If the system determines that the cancellation window between the trader's request to cancel and another trader's request to offer (or bid) is less than 5 milliseconds, then the system may alert the trader on this issue. The trader may adjust her trading algorithms to correct this issue.

In addition to measuring time differences, the system also may measure and analyze other useful information. In some embodiments, the system measures the quantity of requests submitted in response to a previously submitted request. In other embodiments, the system may categorize each of the traders into various categories, such as by the size of the trading firm, specialty areas, etc. . . . , and in return, the system may relay such information to the recipient. As discussed above with reference to the time-difference information, the collected information may be relayed automatically to the recipient, or it may be analyzed and transmitted in processed format to the recipient.

Generally, the system expresses all gathered information either in a non-descript manner or after it has been processed, since the system needs its information providing goals with the desire to preserve the anonymity of its traders.

d. Additional Embodiments

A method comprising: determining a first instance in which a first request is received by an exchange; determining a second instance in which a second request is received by the exchange, in which the second request defines a request to cancel the first request; determining a third instance in which a third request is received by the exchange, in which the third request corresponds to the first request; calculating a first difference between the second instance and the third instances; storing the first difference to a data storage, in which the data storage comprises a plurality of differences; and analyzing the plurality of differences to generate comparative information.

The method of paragraph [00110] further comprises: transmitting the comparative information to a recipient.

The method of paragraph [00111], in which the recipient adjusts a trading algorithm in response to the comparative information.

The method of paragraph [00110], in which the first and second requests are submitted by a trader and the third request is submitted by a different trader.

The method of paragraph [00110], in which the first request, the second request and the third request represent a financial command.

The method of paragraph [00114], in which the financial command is at least one of: a request to sell a security, a request to buy the security, a request to modify the security, a request to cancel the security, a request to wait-and-see, and a request to hold.

The method of paragraph [00115], in which the request to sell the security remains on the exchange until matched with a request to buy the security.

The method of paragraph [00115], in which the request to sell the security is submitted in response to a request to buy the security.

The method of paragraph [00115], in which the request to buy the security remains on the exchange until matched with a request to sell the security.

The method of paragraph [00115], in which the request to buy the security is submitted in response to a request to sell the security.

The method of paragraph [00110] further comprises the computer system configured to: assign time stamps to the first request, the second request and the third request; and store the time stamps to the data storage.

The method of paragraph [00110] further comprises: calculating a second difference between the first instance and the second instances; and calculating a third difference between the first instance and the third instance.

The method of paragraph [00121] further comprises: comparing the second difference with the third difference; outputting a command to the exchange to remove the first request from the exchange, in which the third difference is greater than the second difference; and transmitting an indicia that the first request has been cancelled.

The method of paragraph [00121] further comprises: comparing the second difference with the third difference; outputting a command to the exchange to match the first request with the third request, in which the second difference is greater than the third difference; and transmitting an indicia that the first request has not been cancelled.

The method of paragraph [00121] further comprises: comparing the second difference with the third difference; and transmitting an indicia that the first request has been cancelled, in which the third difference is greater than the second time difference.

The method of paragraph [00121] further comprises: comparing the second difference with the third difference; and transmitting an indicia that the first request has not been cancelled, in which the second difference is greater than the third difference.

The method of paragraph [00110] further comprises: comparing the first difference with a threshold, in which the threshold defines a time period that a trader determines as appropriate for a request to arrive at the exchange; determining that the first difference is greater than the threshold; and transmitting an error message to the trader.

The method of paragraph [00126], in which the error message indicates a problem with transmitting requests to the exchange.

The method of paragraph [00126], in which the error message indicates that a risk level deemed unacceptable by the trader has been exceeded.

The method of paragraph [00110], in which the comparative information comprises: a second difference comprising a difference between the first instance and the second instances; and a third difference comprising a difference between the first instance and the third instance.

A storage medium containing machine instructions readable by a computer system that comprises a data store to configure the computer system to perform the method of paragraph [00110].

The storage medium of paragraph [00130], further configured to: transmit the comparative information to a recipient.

The storage medium of paragraph [00131], in which the recipient adjusts a trading algorithm in response to the comparative information.

The storage medium of paragraph [00130], in which the first request, the second request and the third request represent a financial command.

The storage medium of paragraph [00133], in which the financial command is at least one of: a request to sell a security, a request to buy the security, a request to modify the security, a request to cancel the security, a request to wait-and-see, and a request to hold.

The storage medium of paragraph [00130] further configured to: calculate a second difference between the first instance and the second instances; and calculate a third difference between the first instance and the third instance.

The storage medium of paragraph [00133] further configured to: compare the second time difference with the third time difference; and transmit an indicia that the first request has been cancelled, in which the third time difference is greater than the second time difference.

The storage medium of paragraph [00133] further configured to: compare the second time difference with the third time difference; and transmit an indicia that the first request has not been cancelled, in which the second time difference is greater than the third time difference.

The storage medium of paragraph [00133], in which the comparative information comprises: a second difference comprising a difference between the first instance and the second instances; and a third difference comprising a difference between the first instance and the third instance.

A method comprising: determining a first instance in which a first request is received by an exchange; determining a second instance in which a second request is received by the exchange, in which the second request defines a request to cancel the first request; determining a third instance in which a third request is received by the exchange, in which the third request is submitted in response to the first request; calculating a first difference between the second instance and the third instance; calculating a second difference between the first instance and the second instance; calculating a third difference between the first instance and the third instance; and comparing the second difference with the third difference; and transmitting an indicia representing the first difference to a recipient, in which the recipient adjusts a trading algorithm in response to the first difference.

The method of paragraph [00139], in which the act of comparing the second request with the third request further comprises: outputting a command to cancel the first request, in which the third difference is greater than the second difference; and transmitting an indicia that the first request has been cancelled.

The method of paragraph [00139] in which the act of comparing the second request with the third request further comprises: outputting a command to the exchange to match the first request with the third request, in which the second difference is greater than the third difference; and transmitting an indicia that the first request has not been cancelled.

What is claimed:
1. A method comprising:
transmitting, via a processor to a trading system, requests based on at least one trading algorithm, in which the requests include:
(i) a bid request or an offer request; and
(ii) a request to cancel the bid request or the offer request at a later instance in time;
in which the processor and the trading system are in electronic communication over a network;
receiving, via the processor, an indication that the request to cancel was unsuccessful and the bid request or the offer request has been matched;
receiving a time by which the request to cancel was received and a time by which the bid request or the offer request was matched;
computing a difference between the time by which the request to cancel was received and the time by which the bid request or the offer request was matched, in which the difference comprises a length of time by which the request to cancel was unsuccessful; and
adjusting, via the processor, the at least one trading algorithm based at least in part on the computed length of time.
2. The method of claim 1 further comprising:
comparing the computed length of time against a threshold.

3. The method of claim 2 further comprising:
  determining that the computed length of time exceeds the threshold time; and
  transmitting an indication that a transmission error has occurred.
4. The method of claim 2 further comprising:
  determining that the computed length of time exceeds the threshold time; and
  transmitting an adjustment to the at least one trading algorithm.
5. The method of claim 1 further comprising:
  storing the computed length of time with a plurality of lengths of time, in which each of the plurality of lengths of time were computed from previous transactions with the trading system.
6. The method of claim 5 further comprising:
  computing a trend based on the computed length of time and the plurality of lengths of time.
7. The method of claim 6, in which computing the trend further comprising:
  computing an average of the plurality of the lengths of time over a period of time;
  comparing the computed average against a threshold time.
8. The method of claim 7 further comprising:
  determining that the computed average exceeds the threshold time; and
  transmitting an indication that a transmission error has occurred.
9. The method of claim 7 further comprising:
  determining that the computed average exceeds the threshold time; and
  transmitting an adjustment to the at least one trading algorithm.
10. An apparatus comprising:
  a processor; and
  a memory, in which the memory stores instructions which, when executed by the processor, direct the processor to:
    transmit requests based on at least one trading algorithm, in which the requests include:
      (i) a bid request or an offer request; and
      (ii) a request to cancel the bid request or the offer request at a later instance in time;
    receive an indication that the request to cancel was unsuccessful and the bid request or the offer request has been matched;
    receiving a time by which the request to cancel was received and a time by which the bid request or the offer request was matched;
    computing a difference between the time by which the request to cancel was received and the time by which the bid request or the offer request was matched, in which the difference comprises a length of time by which the request to cancel was unsuccessful; and
    adjust the at least one trading algorithm based at least in part on the computed length of time.
11. The apparatus of claim 10, in which the memory stores instructions which, when executed by the processor, direct the processor to:
  compare the computed length of time against a threshold.
12. The apparatus of claim 11, in which the memory stores instructions which, when executed by the processor, direct the processor to:
  determine that the computed length of time exceeds the threshold time; and
  transmit an indication that a transmission error has occurred.
13. The apparatus of claim 11, in which the memory stores instructions which, when executed by the processor, direct the processor to:
  determine that the computed length of time exceeds the threshold time; and
  transmit an adjustment to the at least one trading algorithm.
14. The apparatus of claim 1, in which the memory stores instructions which, when executed by the processor, direct the processor to:
  store the computed length of time with a plurality of lengths of time, in which each of the plurality of lengths of time were computed from previous transactions with the trading system.
15. The apparatus of claim 14, in which the memory stores instructions which, when executed by the processor, direct the processor to:
  compute a trend based on the computed length of time and the plurality of lengths of time.
16. The apparatus of claim 15, in which the memory stores instructions which, when executed by the processor, direct the processor to:
  compute an average of the plurality of the lengths of time over a period of time;
  compare the computed average against a threshold time.
17. The apparatus of claim 16, in which the memory stores instructions which, when executed by the processor, direct the processor to:
  determine that the computed average exceeds the threshold time; and
  transmit an indication that a transmission error has occurred.
18. The apparatus of claim 16, in which the memory stores instructions which, when executed by the processor, direct the processor to:
  determine that the computed average exceeds the threshold time; and
  transmit an adjustment to the at least one trading algorithm.
19. An article of manufacture comprising:
  a computer-readable medium that is non-transitory, in which the computer-readable medium stores instructions which, when executed by a processor, direct the processor to:
    transmit requests based on at least one trading algorithm, in which the requests include:
      (i) a bid request or an offer request; and
      (ii) a request to cancel the bid request or the offer request at a later instance in time;
    receive an indication that the request to cancel was unsuccessful and the bid request or the offer request has been matched;
    receiving a time by which the request to cancel was received and a time by which the bid request or the offer request was matched;
    computing a difference between the time by which the request to cancel was received and the time by which the bid request or the offer request was matched, in which the difference comprises a length of time by which the request to cancel was unsuccessful; and
    adjust the at least one trading algorithm based at least in part on the computed length of time.
20. The article of manufacture of claim 19, in which the computer-readable medium stores instructions which, when executed by the processor, direct the processor to:
  compare the computed length of time against a threshold.

21. The article of manufacture of claim 20, in which the computer-readable medium stores instructions which, when executed by the processor, direct the processor to:
- determine that the computed length of time exceeds the threshold time; and
- transmit an indication that a transmission error has occurred.

22. The article of manufacture of claim 20, in which the computer-readable medium stores instructions which, when executed by the processor, direct the processor to:
- determine that the computed length of time exceeds the threshold time; and
- transmit an adjustment to the at least one trading algorithm.

23. The article of manufacture of claim 19, in which the computer-readable medium stores instructions which, when executed by the processor, direct the processor to:
- store the computed length of time with a plurality of lengths of time, in which each of the plurality of lengths of time were computed from previous transactions with the trading system.

24. The article of manufacture of claim 23, in which the computer-readable medium stores instructions which, when executed by the processor, direct the processor to:
- compute a trend based on the computed length of time and the plurality of lengths of time.

25. The article of manufacture of claim 24, in which the computer-readable medium stores instructions which, when executed by the processor, direct the processor to:
- compute an average of the plurality of the lengths of time over a period of time;
- compare the computed average against a threshold time.

26. The article of manufacture of claim 25, in which the computer-readable medium stores instructions which, when executed by the processor, direct the processor to:
- determine that the computed average exceeds the threshold time; and
- transmit an indication that a transmission error has occurred.

27. The article of manufacture of claim 25, in which the computer-readable medium stores instructions which, when executed by the processor, direct the processor to:
- determine that the computed average exceeds the threshold time; and
- transmit an adjustment to the at least one trading algorithm.

* * * * *